United States Patent
Abbiati (10) Patent No.: US 11,435,541 B2
(45) Date of Patent: Sep. 6, 2022

(54) FIBER MANAGEMENT SYSTEM FOR MANAGING AND DISTRIBUTING OPTICAL FIBERS

(71) Applicant: Prysmian S.p.A., Milan (IT)

(72) Inventor: Fabio Abbiati, Milan (IT)

(73) Assignee: PRYSMIAN S.P.A., Milan (IT)

( * ) Notice: Subject to any disclaimer, the term of this patent is extended or adjusted under 35 U.S.C. 154(b) by 179 days.

(21) Appl. No.: 16/957,022

(22) PCT Filed: Dec. 22, 2017

(86) PCT No.: PCT/IT2017/000294
§ 371 (c)(1),
(2) Date: Jun. 22, 2020

(87) PCT Pub. No.: WO2019/123496
PCT Pub. Date: Jun. 27, 2019

(65) Prior Publication Data
US 2021/0199907 A1    Jul. 1, 2021

(51) Int. Cl.
*G02B 6/00* (2006.01)
*G02B 6/44* (2006.01)
(52) U.S. Cl.
CPC ......... *G02B 6/4452* (2013.01); *G02B 6/4455* (2013.01)
(58) Field of Classification Search
CPC .. G02B 6/4452; G02B 6/4455; G02B 6/4454; G02B 6/4471; G02B 6/00
See application file for complete search history.

(56) References Cited

U.S. PATENT DOCUMENTS

| | | | |
|---|---|---|---|
| 5,870,519 A * | 2/1999 | Jenkins | G02B 6/00 385/135 |
| 7,349,616 B1 * | 3/2008 | Castonguay | G02B 6/445 398/67 |
| 2013/0214662 A1 * | 8/2013 | Pimentel | G02B 6/4471 211/13.1 |

FOREIGN PATENT DOCUMENTS

| | | |
|---|---|---|
| DE | 102014015969 A1 | 5/2016 |
| EP | 2439570 A1 | 4/2012 |
| EP | 2616860 A1 | 7/2013 |
| EP | 2833180 A1 | 2/2015 |
| WO | 2009106874 A1 | 9/2009 |

* cited by examiner

*Primary Examiner* — Jennifer Doan
(74) *Attorney, Agent, or Firm* — Slater Matsil, LLP (57) ABSTRACT

A fiber management system for managing and distributing optical fibers comprises at least one supporting element, at least one splice tray pivotally mounted on the supporting element around a pivot axis (X), distributing elements for routing incoming fiber modules toward the splice tray and for routing outgoing fiber modules away from the splice tray, the distributing elements being oriented along respective routing directions transverse to the pivot axis. At least one guiding channel is provided on the supporting element for guiding at least the incoming fiber modules toward the splice tray along a direction substantially parallel to the pivot axis (X), and a retention block acts into the guiding channel between a plurality of retention positions wherein each retention position of the retention block defines a respective passageway for the incoming fiber modules.

18 Claims, 6 Drawing Sheets

FIBER MANAGEMENT SYSTEM FOR MANAGING AND DISTRIBUTING OPTICAL FIBERS

CROSS-REFERENCE TO RELATED APPLICATIONS

This application is a national stage of International Application No. PCT/IT2017/000294, filed on Dec. 22, 2017, which application is hereby incorporated herein by reference in its entirety.

TECHNICAL FIELD

The present invention relates to a fiber management system for managing and distributing optical fibers.

BACKGROUND

Optical fiber systems for management and distribution of optical fibers are known in the art. The optical fiber systems are used, for example, in joint closures, wall boxes, distribution cassettes, central office equipment as well as in optical fiber networks, e.g. the fiber-to-the-home (FTTH) networks.

Generally, an optical fiber system comprises a plurality of splice trays for storing and splicing optical fibers together.

Storage areas are provided upstream the splice area to store extra-length portions of the optical fibers which are actually used, so as to avoid for example that an installer error oblige the installer to deploy another entire new cable, as well as to store optical fibers which are not used.

Typically, an optical fiber system further comprises routing elements, namely transportation tubes or routing channels, for suitably directing fiber modules, which enter and exit the optical fiber system, toward the splice trays and away from the splice trays.

Managing how the fiber modules are routed to the splice trays and how an installer gains access to the individual splice trays is an important and quite complex operation.

Document DE 10 2014 015969 discloses an optical fiber system for management and distribution of optical fibers having a bottom wall supporting a plurality of splice trays, an upper wall opposite to the bottom wall and a transition wall connecting the bottom wall to the upper wall. A fiber module containing twelve glass fibers is fed between the bottom wall and the upper wall. Holding elements for the bare fibers of the fiber module are provided on the transition wall and comprise straight tunnel-shaped passages oriented in a longitudinal direction. Each straight tunnel-shaped passage is formed by two arcuate elements between which an oblique slot is defined. A bare fiber is inserted into the tunnel-shaped passage by passing through the oblique slot, so passing through a sort of "labyrinth" that retains the bare fiber.

Document WO 2009/106874 discloses an optical fiber organiser assembly comprising support trays and a base plate support. The support trays are hinged to the base plate to enable the individual trays to be pivoted about their respective hinge axis to provide access to the trays. Guides are provided on respective sides of the support trays for guiding lengths of fiber to and from the respective support trays. A plurality of upstanding rectangular blocks are provided adjacent to the guide elements. Each block comprises four openings in the form of open channels which are arranged in a 2×2 array with the longitudinal axes of the channels being aligned substantially parallel to the respective hinge axis of the trays. The elongate open channels are slightly tapered so that they have a frusto-conical shape. The end of the optical fiber cable where the fiber is broken out is provided with a cable termination in the form of a sleeve having frusto-conical shape for being inserted into the elongate open channels and retained thereto.

BRIEF DESCRIPTION OF THE DRAWINGS

The present invention will be now described more fully hereinafter with reference to the accompanying drawings, in which some, but not all embodiments of the invention are shown.

Drawings illustrating the embodiments are not to scale representations.

For the purpose of the present description and of the appended claims, use of the "a" or "an" are employed to describe elements and components of the invention. This is done merely for convenience and to give a general sense of the invention. This description should be read to include one or at least one and the singular also includes the plural unless it is obvious that it is meant otherwise.

For the purpose of the present description and of the appended claims, except where otherwise indicated, all numbers expressing amounts, quantities, percentages, and so forth, are to be understood as being modified in all instances by the term "about".

DETAILED DESCRIPTION OF ILLUSTRATIVE EMBODIMENTS

Fiber modules usually enter a fiber management system from a bottom entry points. From the bottom entry point where the modules are retained from external stresses the modules pass through protected channels to a backplate that holds the splice trays.

The Applicant has noted that different network configurations sometimes require that fiber modules enter the fiber management system from the side.

The Applicant has observed that it can occur that the installers enter the fiber modules into the fiber management system from side direction by completely breaking the sidewalls of the protected channels.

The Applicant has noted that in such situations fiber modules are exposed to installer mishandling. It can for example happen that installers move the fiber modules so causing movement and stress in the fibers spliced or parked in the tray.

The Applicant has observed that the fiber management system according to DE 102014015969 provides for holding elements allowing bare fibers to be retained in a longitudinal direction (i.e. in a side direction) before their entrance into the tray. However, the Applicant has observed that bare fibers arranged outside the splice trays can be subjected to damages due to their weakness, especially when the fiber management system is used in unprotected environment. Moreover, in case the installer breaks the transition wall for providing a direct side access to the trays, the holding elements disclosed by document DE 102014015969 would no longer be suitable for retaining the bare fibers.

The Applicant has further observed that the optical fiber organiser assembly disclosed by document WO 2009/106874 requires quite complex operation for allowing a side insertion of the fiber modules. Indeed, WO 2009/106874 requires providing each fiber module with a proper sleeve for being inserted and thus retained in the elongate open channel. Moreover, as the sleeve should be provided where the module fiber is broken out, there is little margin to possible installer error in breaking out the fiber modules. Moreover, the upstanding rectangular blocks according to WO 2009/106874 are unsuitable for retaining fiber modules of different dimensions, since the elongate open channels provided within the rectangular blocks can receive just one predetermined size of fiber module.

The Applicant has tackled the problem of providing a fiber management system with side entrances for fiber modules allowing an easy and effective retain of fiber modules irrespective from their dimensions and numbers.

The Applicant has found that by channeling all the fiber modules in a side position with respect to one or more splice trays, the fiber modules form a bunch that laterally reaches the splice trays and that can be retained by gently pressing the same.

The Applicant realized that by proving at least one guiding channel for guiding at least incoming fiber modules toward the splice tray along a direction substantially parallel to the pivot axis of the splice tray, and by proving a retention block acting into the guiding channel between a plurality of retention positions, it is possible to apply a gentle pressure on the bunch of fiber modules irrespective from their dimensions and numbers.

Consistently, embodiments of the present invention relate to a fiber management system for managing and distributing optical fibers comprising: at least one supporting element; at least one splice tray pivotally mounted on the supporting element around a pivot axis; distributing elements for routing incoming fiber modules toward said splice tray and for routing outgoing fiber modules away from said splice tray, said distributing elements being oriented along respective routing directions transverse to said pivot axis; at least one guiding channel provided on said supporting element for guiding at least said incoming fiber modules toward said splice tray along a direction substantially parallel to said pivot axis. A retention block acts into said guiding channel between a plurality of retention positions wherein each retention position of the retention block defines a respective passageway for said incoming fiber modules.

As a result of the embodiments of the present invention, an optical fiber management system is provided which is easy and effective to side access. Fiber modules can be routed to the relevant splice trays through the distributing elements and then side accessed to the splice trays through the guiding channel. The retention block, depending on the retention position reached, provides for a tight passageway for the fiber modules and exerts a light pressure on the latter, so preventing the fiber modules from possible movement.

Throughout this description and in the following claims, the expression "optical fiber" is used to indicate an elongated optical element comprising an optical waveguide, constituted by an optically transmissive core, surrounded by a cladding. The optical waveguide is preferably covered by at least one protective coating layer. Two protective coating layers are preferably provided: a first coating layer (primary coating) is in direct contact with the optical waveguide, while a second coating layer (secondary coating) covers the primary coating. In addition, a buffer layer may cover the optical fiber. The buffer layer may be substantially in contact with the secondary coating (tight buffer) or it may consist of a small tube housing one or more optical fibers (loose buffer).

The expression "fiber module" is used to indicate one or more optical fibers surrounded by a common external layer.

Preferably, said guiding channel is positioned, along a direction parallel to said pivot axis, between one distributing element and said splice tray.

This allows the fiber modules to be routed through the distributing element and then deflected into the guiding channel. Therefore, even in case an installer breaks the distributing element for realizing a direct side access to the splice trays, the guiding channel would be still active on the fiber modules.

Preferably, said guiding channel comprises a first and a second guiding walls projecting from a base wall of said supporting element; said retention block being inserted between said first and second guiding walls.

Preferably, said retention block extends between and contacts said first guiding wall and said second guiding wall.

This ensure that the retention block acts on all the fiber modules routed by the guiding channel.

Preferably, are provided retention members acting between said retention block and said guiding channel for holding said retention block at different retention positions.

The retention members allow the retention block to firmly engage the guiding channel and to exert a light pressure on the fiber modules.

Preferably, said retention members comprise a first tooth extending from said first wall toward said second wall and a second tooth extending from said second wall toward said first wall; said first and second tooth being configured to interfere with said retention block.

Preferably, said retention block is made from an elastic deformable material.

Preferably, said retention block comprises a plurality of indents configured for engaging said first and second tooth.

The plurality of indents provides for a plurality of possible stable retention position of the retention block, so allowing an installer to select the retention position that actually blocks the fiber modules into the guiding channel and that does not exert an excessive pressure onto the fiber modules.

Preferably, said retention block comprises two opposed side walls at least partially counter shaped to said first and second walls of said guiding channel.

In this way, the walls of the guiding channel cooperates with the retention members in holding in position the retention block.

Preferably, said indents are provided on said two opposed sides walls of the retention block.

This increases the stability of the retention position reached by the retention block.

Preferably, at each engagement between an indents and a corresponding tooth corresponds a retention position of the retention block.

Preferably, said indents are stacked along said side walls of the retention block.

In this way, by spacing with a selected distance each indent from the preceding and successive indent, it is possible to set the step between two adjacent retention positions.

Preferably, said retention block comprises a top wall, a base wall facing said base wall of the supporting element and a grab portion connected to said top wall and configured for being caught by an installer.

This helps the installer during the routing operations.

Preferably, it is provided a plurality of splice trays pivotally mounted on a common supporting element around respective pivot axes parallel each other.

Preferably, it is provided a plurality of supporting elements stacked along a direction substantially perpendicular to said pivot axis.

Preferably, each distributing element comprises a bottom wall defined by an end portion of said base wall of the supporting element and a lateral wall extending from said bottom wall and opposite to said guiding channel.

Preferably, each distributing element comprises a weakening line between said bottom wall and said lateral wall configured for allowing the lateral wall to be detached from the bottom wall.

In this way, a direct side access to the guiding channel is simplified.

Figure 1:
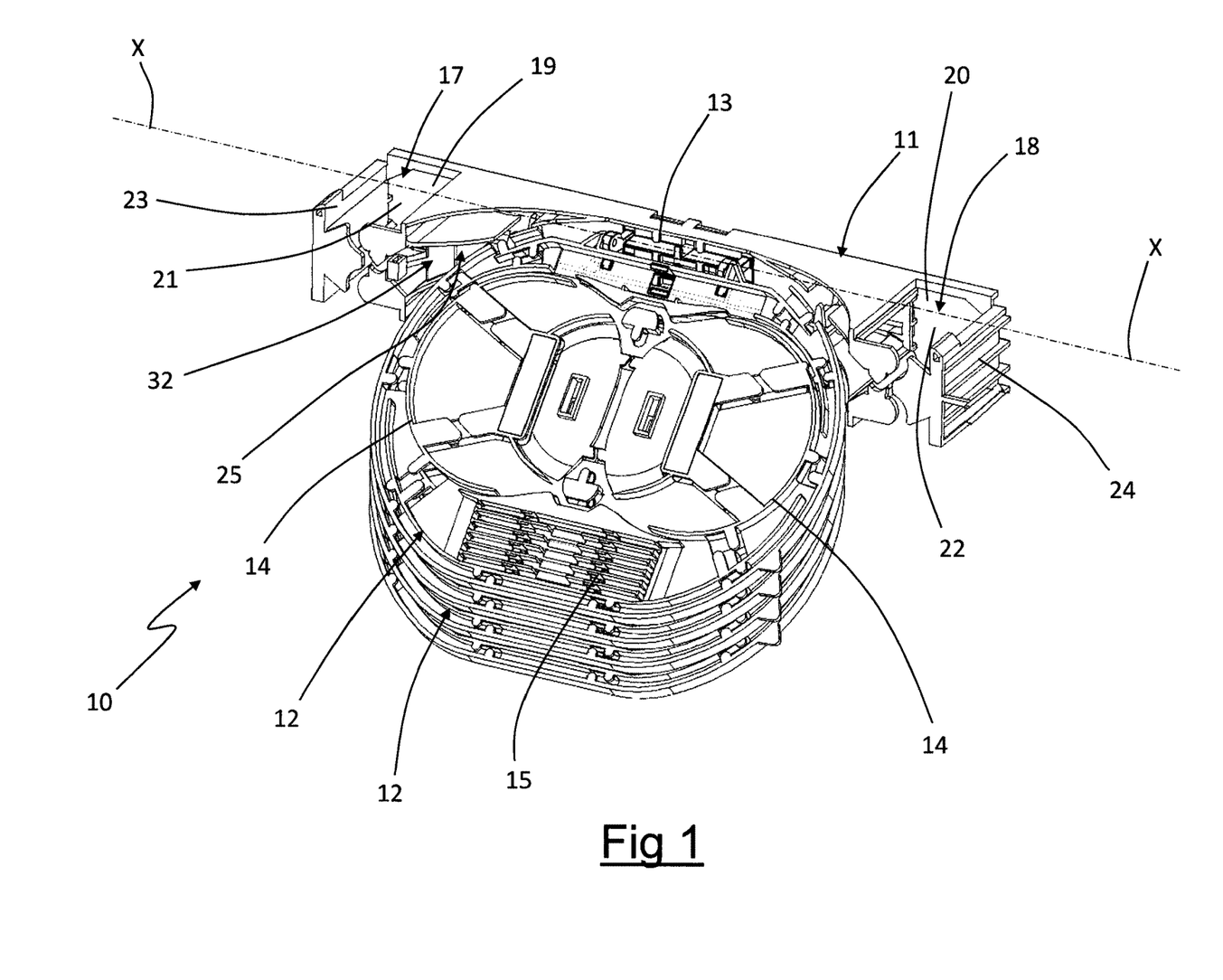
FIG. 1 shows a schematic view of an optical fiber management system for managing and distributing optical fibers according to an embodiment of the present invention.

An optical fiber management system for managing and distributing optical fibers according to an embodiment of the present invention is indicated with the reference number 10 in FIG. 1.

As shown in FIG. 1 the optical fiber management system 10 comprises a supporting element 11 and a plurality of splice trays 12 (four splice trays in FIG. 1).

The splice trays 12 are swivelled mounted on the supporting element 11 around respective pivot axes X parallel each other.

According to an embodiment of the present invention, the splice trays 12 are superimposed in a stack and lie in respective parallel planes. The stack of splice trays 12 extends vertically. In detail, when the system is installed and the splice trays 12 are not accessed by the installer for operating thereon, each splice tray 12 usually lies in a plane containing said pivot axis X and angled downwardly (typically by an angle comprised between 40° and 50° with respect an horizontal plane).

Each splice tray 12 is mounted on and coupled to the supporting element 11 by means of a respective hinge 13 (as better shown in FIG. 1).

The hinges 13 allow each splice tray 12 to pivot about the respective pivot axis X, the latter being horizontal and perpendicular to a vertical direction.

Figure 8:
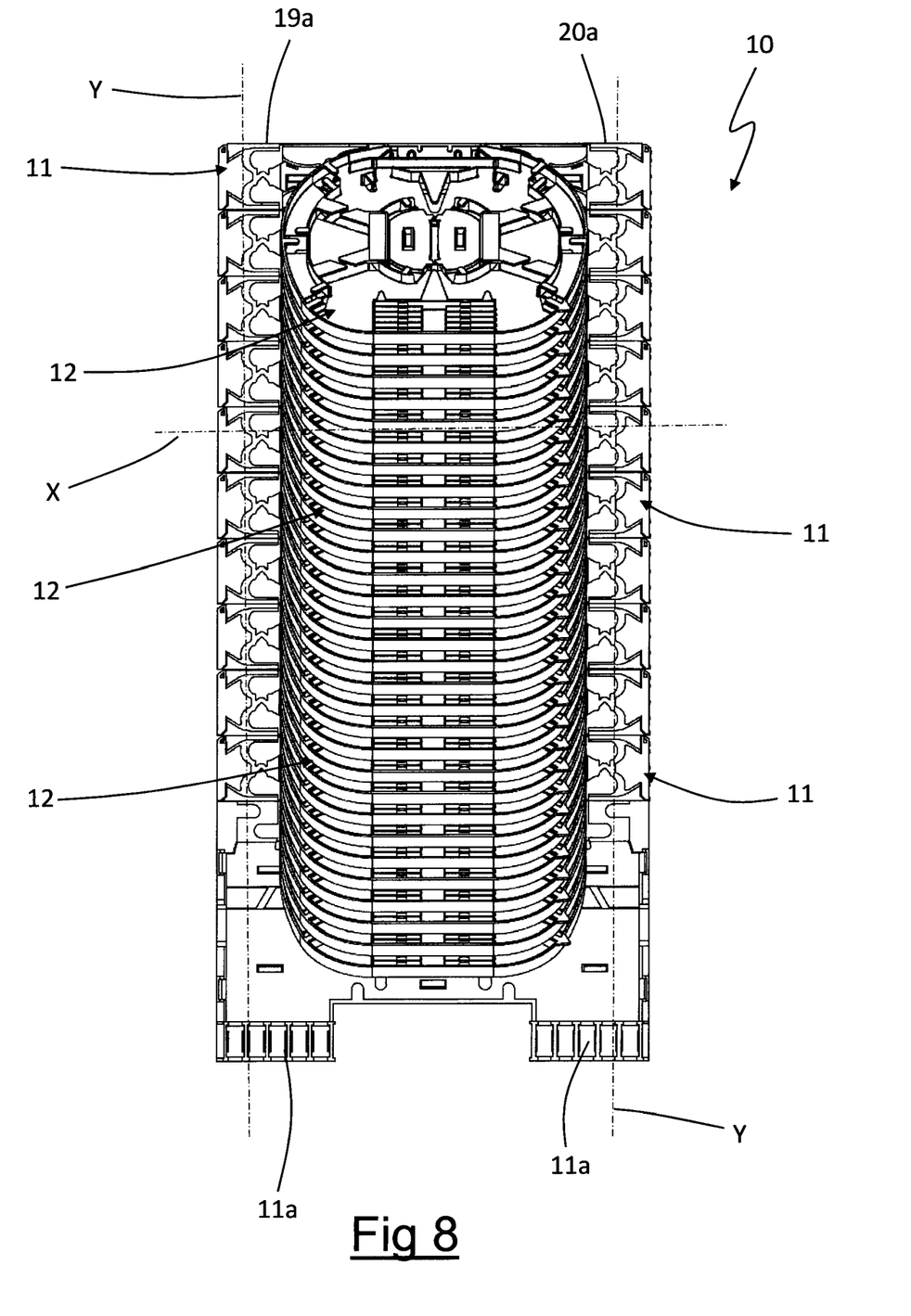
FIG. 8 shows a schematic perspective view of a stack of optical fiber management systems of FIG. 1.

In the preferred embodiment of the present invention, a plurality of supporting element 11 are superimposed in a vertical stack (FIG. 8 shows a stack of ten supporting element 11).

In the case an installer needs to work in the splice tray 12, the latter can be flipped up to expose the underneath splice trays 12. This means that the top splice tray 12 can be rotated upwardly.

Similarly, all the other splice trays 12 in the stack can be flipped up so that any of the splice trays 12 can be accessed. This allow an installer, who is requested to route and splice a further optical fiber within the system 10, to easily access the desired splice tray 12 by flipping up the splice trays 12 which are positioned above the desired splice tray.

At the end of the operation which has been carried out by the installer on the desired splice tray 12, the splice tray 12 can be flipped down again so that all the splice trays 12 lie in substantially parallel planes.

Each splice tray 12 comprises a storage track 14 to store extra-length portions of the optical fibers which are actually used.

Each splice tray 12 further comprises one or more splice bays 15 (six splice bays 15 in the embodiment of FIG. i) for holding mechanical or fusion splice joints between an incoming optical fiber and an outgoing optical fiber.

A typical operation carried out by an installer is the splitting of an incoming fiber module into a plurality of optical fibers which are spliced to outgoing optical fibers, placing the splice joints in the splice bays 15 and winding extra lengths of the incoming optical fibers and outgoing optical fibers around the storage track 14 of a splice tray 12

Typically, an incoming fiber module comprises 2, 4, 8, 16 or 32 optical fibers so that up to 32 customers can be supplied from only one incoming fiber module.

The routing of the fiber modules towards and away from the splice trays 12 is performed by the supporting element 11. Therefore, the supporting element 11 has the function of both supporting the splice trays 12 and routing the incoming and outgoing fiber modules or optical fibers.

The supporting element 11 comprises a base wall 16 extending in a vertical plane and configured to be connected to a case (not illustrated).

Figure 2:
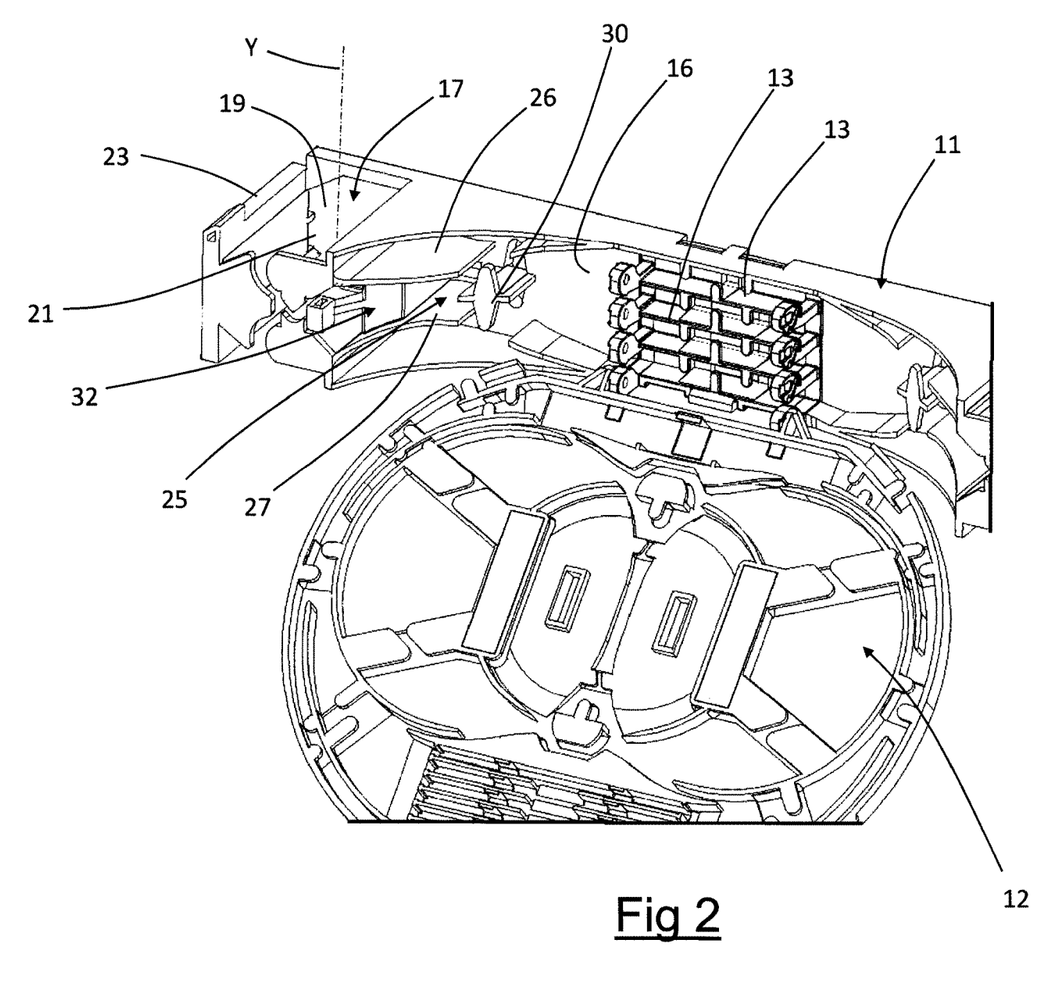
FIG. 2 shows a magnified schematic perspective view of some details of the optical fiber management system of FIG. 1.

As better illustrated in FIG. 2, the hinges 13 are provided on the base wall 16 of the supporting element 11 in a central portion thereof.

At opposed end portions of the supporting element 11 are provided two distributing elements 17, 18, specifically a first distributing element 17 and a second distributing element 18, which provide for the distribution of the fiber modules entering to and exiting from the splice trays 12 along respective routing directions Y.

Each distribution element 17, 18 presents a central channel 19, 20 vertically aligned, namely substantially perpendicular to the pivot axis X of each splice tray 12 and parallel to a routing direction Y.

Each central channel 19, 20 is defined by a respective bottom wall 21, 22 and a respective lateral wall 23, 24 extending from the bottom wall 21, 22. The bottom walls 21, 22 are defined by opposite end portions of the base wall 16 of the supporting element 11.

Each central channel 19, 20 of a supporting element 11 is vertically aligned with the corresponding central channel 19, 20 of the other supporting elements 11, so as to form two vertical channels 19a, 20a that from the lowermost supporting element 11 reach the uppermost supporting element 11 of the vertical stack of supporting element 11.

Moreover, under the lowermost supporting element 11, and in particular under both the central channels 19, 20, a plurality of holding members 11a are provided for retaining the incoming and the outgoing fiber modules that enters or leaves the system 10.

Each lateral wall 23, 24 of a central channel 19, 20 is connected to the respective bottom wall 21, 22 by a weakened coupling (as for example a weakening line) so that an installer can easily detach the lateral wall 23, 24 from the bottom wall 21, 22 for directly accessing to the splice trays 12.

Between one distribution element 17 and the splice tray 12, and in particular between the first distribution element 17 and the hinges 13, the supporting element 11 comprises a guiding channel 25.

The guiding channel 25 defines a channel substantially horizontally aligned, namely aligned along a direction parallel to the pivot axis X.

The guiding channel 25 emerges from the base wall 16 of the supporting element n and is configured for guiding incoming fiber modules toward the splice tray 12 along a direction substantially parallel to the pivot axis.

The guiding channel 25 is thus oriented substantially perpendicular to the central channel 19 of the first distribution element 17 and provides for a substantially horizontal entrance to the splice trays 12.

In particular, incoming fiber modules can reach the guiding channel 25 from the central channel 19 of the first distribution element 17 by being deflected from a vertical direction to a horizontal direction or can reach the guiding channel 25 from a substantially horizontal direction by removing the lateral wall 23 of the first distribution element 17.

Any case, the guiding channel 25 routes the incoming fiber modules along a direction substantially parallel to the pivot axis X of the splice tray 12 (i.e. a substantially horizontal direction) toward the splice trays 12.

In the preferred embodiment of the invention, the guiding channel 25 comprises a first 26 and a second guiding walls 27 projecting from the base wall 16 of the supporting element 11.

Figure 4:
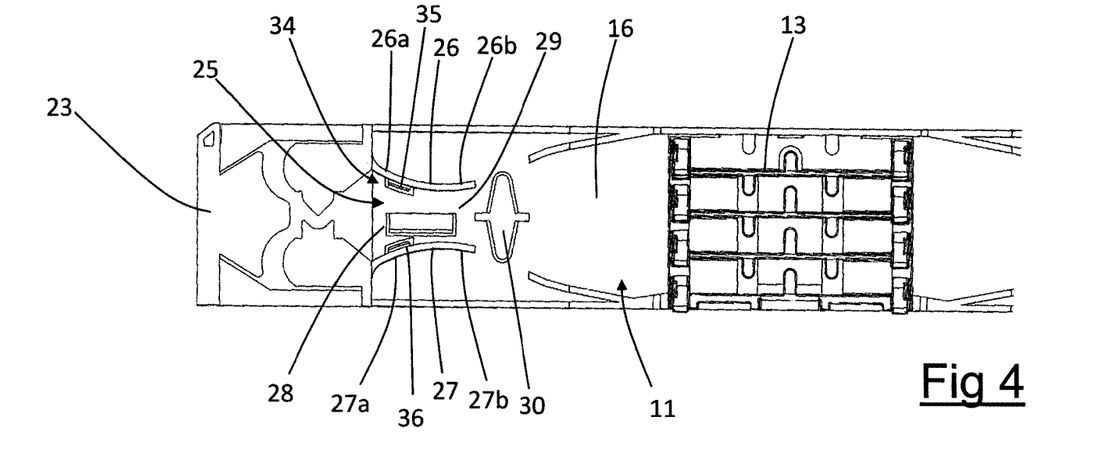
FIGS. 4 and 5 show frontal views of some details of the optical fiber management system of FIG. 1.

As better shown in FIG. 4, the two guiding walls 26, 27 are curved and present a respective first portion 26a, 27a defining a convergent channel 28 and a respective second portion 26b, 27b defining a divergent channel 29 (see FIG. 4). The divergent channel 29 is closer to the splice trays 12 (namely to the hinges 13) than the convergent channel 28.

Between the guiding channel 25 and the splice trays 12 is provided a diverting element 30 for rerouting the fiber modules or the optical fibers of the fiber modules toward the splice trays 12 and to keep the fiber modules or optical fibers close to the base wall 16 of the supporting element 11.

Figure 3:
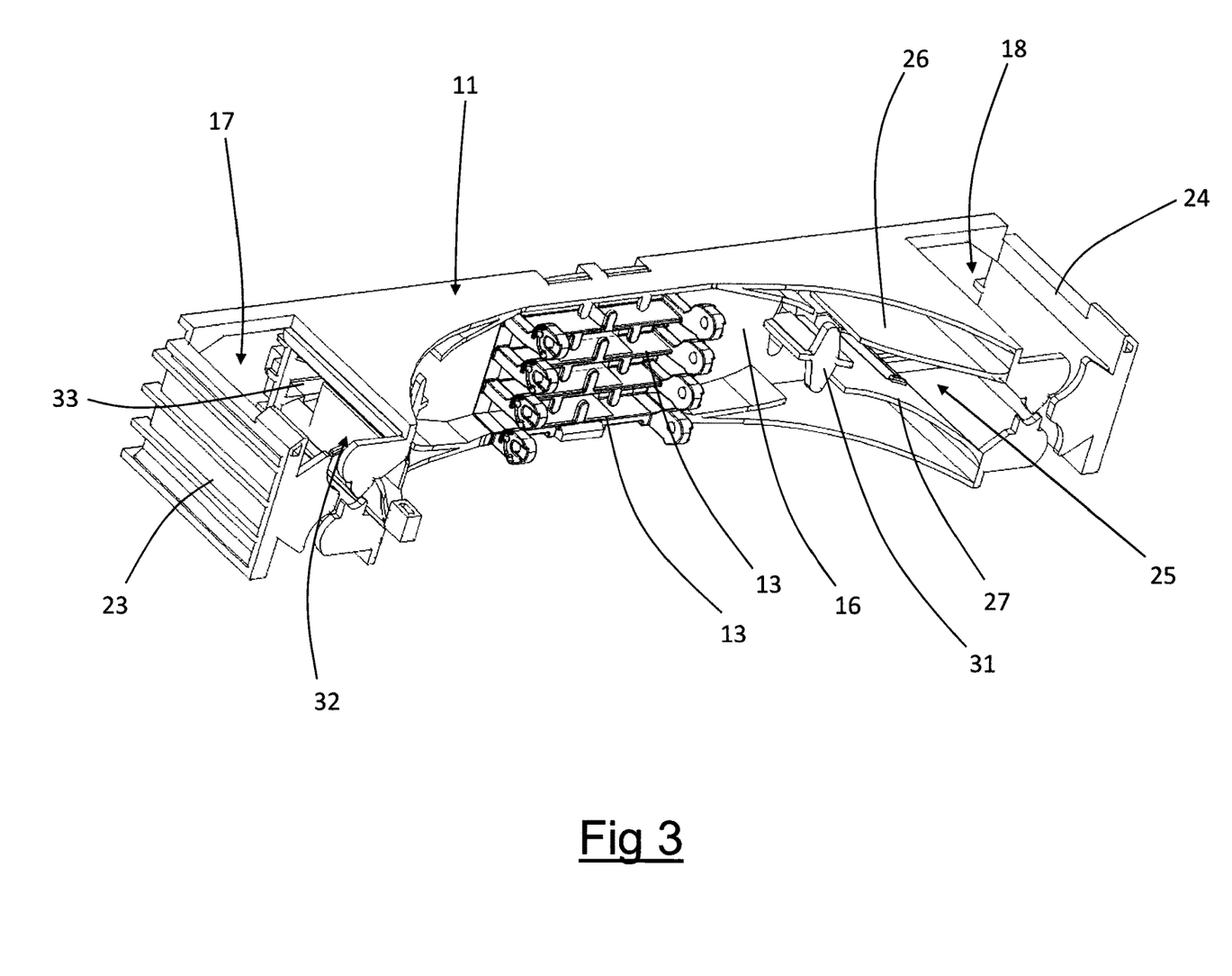
FIG. 3 shows a further magnified schematic perspective view of some details of the optical fiber management system of FIG. 1.

As illustrated in FIG. 3, between the second distribution element 18 and the hinges 13, the supporting element 11 comprises a further guiding channel 25.

Such further guiding channel 25 is identical to the guiding channel 25 provided between the first distributing element 17 and the hinges 13 and provides for an horizontal exit from the splice trays 12.

The guiding channel 25 provided between the second distributing element 18 and the hinges 13 routes the outgoing fiber modules or optical fibers, along a direction substantially parallel to the pivot axis X of the splice tray 12, (i.e. a substantially horizontal direction) away from the splice trays 12.

Between the splice trays 12 and the guiding channel 25 provided between the second distributing element 18 and the hinges 13, is provided a diverting element 31 for rerouting the optical fibers away from splice trays 12.

A retention block 32 acts into the guiding channel 25 for blocking the incoming fiber modules by lightly pressing the latter against the guiding walls 26, 27 and the base wall 16 of the supporting element 11.

The retention block 32 is movable between a plurality of retention positions each of which defines a passageway 33 in the guiding channel 25 (illustrated in FIG. 3) for the incoming fiber modules.

The retention block 32 is inserted into the guiding channel 25 so that at each degree of insertion of the retention block 32 into the guiding channel 25 corresponds a retention position.

Therefore, at each retention position corresponds a predetermined dimension of the passageway 33 in the guiding channel 25.

Each retention position is a stable position of the retention block 32 into the guiding channel 25, so that, depending on the dimension and number of the incoming fiber modules, a stable and suitable passageway 33 can be obtained.

In order to hold the retention block 32 at different retention positions, retention members 34 act between the retention block 32 and the guiding channel 25.

As illustrated in FIG. 4, the retention members 34 comprise a first tooth 35 extending from the first guiding wall 26 toward the second guiding wall 27 and a second tooth 36 extending from the second guiding wall 27 toward the first guiding wall 26.

The retention block 32 is configured to interfere with the teeth 35, 36 and to be blocked in a retention position by the teeth 35, 36.

To this end, the retention members 34 further comprise a plurality of indents 37 provided on the retention block 32 (illustrated in FIGS. 6 and 7) and configured for engaging the first 35 and the second tooth 36.

Figure 6:
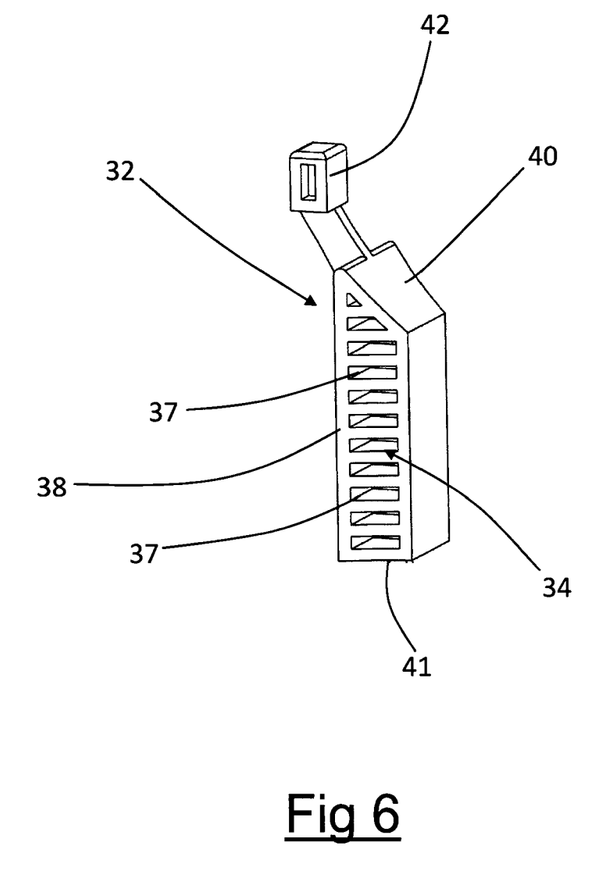
FIGS. 6 and 7 shows schematic perspective views of a component of the optical fiber management system of FIG. 1.
Figure 7:
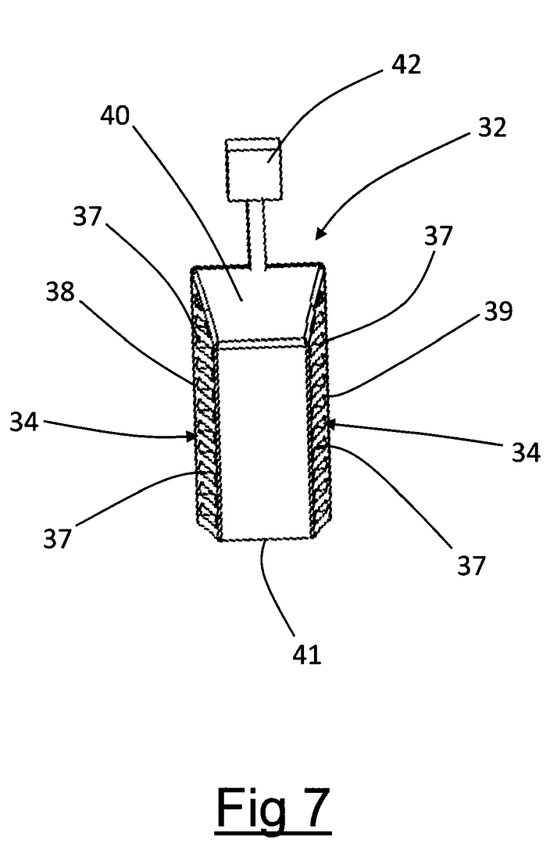

Each indent 37 defines an aperture in the retention block 32 configured to receive one of the above mentioned tooth 35, 36.

Alternatively, the retention block 32 can comprise two opposite indents interfering with a first plurality of teeth provided on the first guiding wall 26 and with a second plurality of teeth provided on the second guiding wall 27.

In the preferred embodiment of the invention, the retention block 32 comprises two opposite side walls 38, 39, a top wall 40 and a base wall 41.

The indents 37 are provided on the opposite side walls 38, 39 of the retention block 32. In particular, a stack of indents 37 is provided on one side wall 38 and a further stack of indents 37 is provided on the other side wall 39 of the retention block 32.

Figure 5:
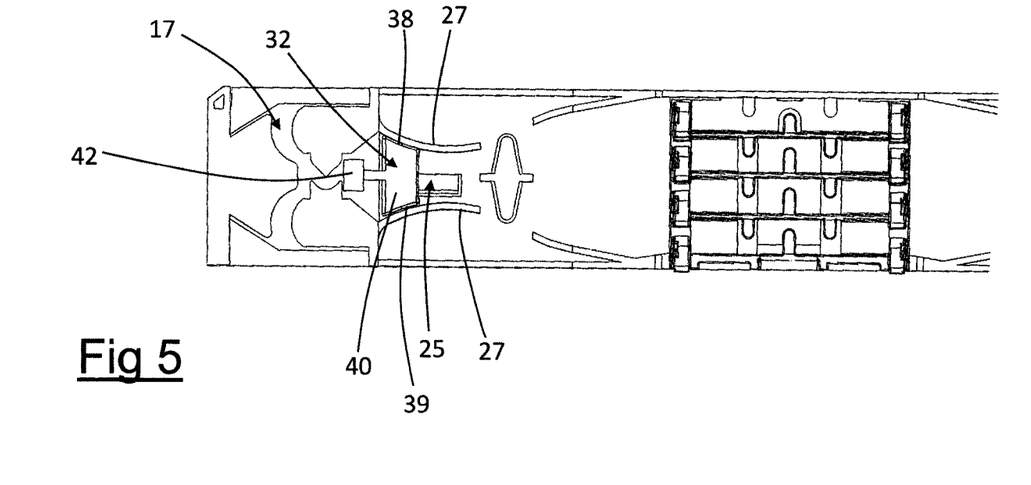

The opposite side walls 38, 39 are counter shaped to at least a portion of the first 26 and second guiding wall 27, as illustrated in FIG. 5.

Preferably, the side walls 38, 39 of the retention block 32 are counter shaped to the first portions 26a, 27a of the first 26 and second guiding wall 27, namely to the convergent channel 28 of the guiding channel 25, as illustrated in FIG. 5.

Alternatively, the side walls 38, 39 of the retention block 32 can be counter shaped to the whole extension of the first 26 and second guiding wall 27.

Any case, the retention block 32 extends between the two guiding walls 26, 27, so that the side walls 38, 39 of the retention block 32 contacts (or are very close to) the two guiding walls 26, 27 of the guiding channel 25. The teeth 35, 36 thus engage two opposed indents 37 and block the retention block 32 in a retention position.

The retention position reached by the retention block 32 depends on the indents 37 engaged by the two teeth 35, 36.

The base wall 41 of the retention block 32 faces the base wall 16 of the supporting element 11. In the preferred embodiment of the present invention, the base wall 41 of the retention block 32 is substantially flat. Since the base wall 41 of the retention block 32 contacts the fiber modules, a substantially flat base wall 41 of the retention block 32 minimizes possible damages to the fiber modules. Alternatively, the base wall 41 of the retention block 32 comprises teeth or has a waved surface to exert additional grip on the fiber modules.

The passageway 33 is defined between the two guiding walls 26, 27, the base wall 26 of the supporting element n and the base wall 41 of the retention block 32.

In particular, the dimension of the passageway 33 is the greatest when the indents 37 engaged by the teeth 35, 36 are the closest to the base wall 41 of the retention block 32.

The dimension of the passageway 33 is the smallest (or is completely close) when the indents 37 engaged by the teeth 35, 36 are the closest to the top wall 40 of the retention block 32.

As illustrated in FIGS. 6 and 7, the retention block 32 comprises a grab portion 42 connected to the top wall 40 and configured for being caught by an installer for positioning the retention block 32 in the guiding channel 25 and for removing the retention block 32 from the guiding channel 25.

During the routing operation carried out by the installer, after the incoming fiber modules has been routed into the guiding channel 25 the installer inserts the retention block 32 into the guiding channel 25 for blocking the fiber modules horizontally. The retention block 32 is inserted into the guiding channel until the base wall 41 contacts the fiber modules. The fiber modules are thus gently pressed against the base wall 16 of the supporting element 11. The indents 37 that in the position reached by the retention block 32 face the teeth 35, 36 are engaged by the latter and the retention block 32 is blocked in the retention position. Any movement of the fiber modules in an horizontal direction is therefore prevented.

In the preferred embodiment of the invention, a further retention block 32, identical to the above mentioned retention block 32, is provided into the guiding channel 25 for the outgoing fiber modules or optical fibers.

Depending on the installation approach followed by an installer, the guiding channel for the outgoing fiber modules can also be used for routing incoming fiber modules, as well as the guiding channel for the incoming fiber modules can also be used for routing outgoing fibers modules or optical fibers.

The invention claimed is:

1. A fiber management system for managing and distributing optical fibers comprising:
    at least one supporting element;
    at least one splice tray pivotally mounted on the at least one supporting element around a pivot axis;
    distributing elements for routing incoming fiber modules toward the splice tray and for routing outgoing fiber modules away from the splice tray, the distributing elements being oriented along respective routing directions transverse to the pivot axis;
    at least one guiding channel provided on the at least one supporting element for guiding at least the incoming fiber modules toward the splice tray along a direction substantially parallel to the pivot axis; and
    a retention block acting into the at least one guiding channel between a plurality of retention positions, wherein each retention position is a stable position of the retention block and defines a respective passageway for the incoming fiber modules.

2. The fiber management system according to claim 1, wherein the guiding channel is positioned between one distributing element and the splice tray.

3. The fiber management system according to claim 1, further comprising a plurality of splice trays pivotally mounted on a common supporting element around respective pivot axes parallel to each other.

4. The fiber management system according to claim 1, further comprising a plurality of supporting elements stacked along a direction substantially perpendicular to the pivot axis.

5. The fiber management system according to claim 1, further comprising retention members acting between the retention block and the guiding channel for holding the retention block at different retention positions.

6. A fiber management system for managing and distributing optical fibers comprising:
    a supporting element;
    a splice tray pivotally mounted on the supporting element around a pivot axis;
    distributing elements for routing incoming fiber modules toward the splice tray and for routing outgoing fiber modules away from the splice tray, the distributing elements being oriented along respective routing directions transverse to the pivot axis;
    a guiding channel provided on the supporting element for guiding the incoming fiber modules toward the splice tray along a direction substantially parallel to the pivot axis;
    a retention block acting into the guiding channel between a plurality of retention positions wherein each retention position of the retention block defines a respective passageway for the incoming fiber modules, wherein the guiding channel comprises a first guiding wall and a second guiding wall projecting from a base wall of the supporting element, the retention block being inserted between the first and second guiding walls, wherein the retention block extends between and contacts the first guiding wall and the second guiding wall; and
    retention members acting between the retention block and the guiding channel for holding the retention block at different retention positions, wherein the retention members comprise a first tooth extending from the first guiding wall toward the second guiding wall and a second tooth extending from the second guiding wall toward the first guiding wall, the first and second tooth being configured to interfere with the retention block.

7. The fiber management system according to claim 6, further comprising retention members acting between the retention block and the guiding channel for holding the retention block at different retention positions.

8. The fiber management system according to claim 6, wherein the retention block comprises a plurality of indents configured for engaging with the first and second tooth.

9. The fiber management system according to claim 8, wherein the retention block comprises two opposed sides walls at least partially counter shaped to the first and second guiding walls of the guiding channel, and wherein the indents are provided on the two opposed sides walls of the retention block.

10. The fiber management system according to claim 9, wherein each engagement between an indent and a corresponding tooth corresponds to a retention position of the retention block.

11. The fiber management system according to claim 9, wherein the indents are stacked along the side walls of the retention block.

12. The fiber management system according to claim 6, wherein the retention block comprises two opposed sides walls at least partially counter shaped to the first and second guiding walls of the guiding channel.

13. The fiber management system according to claim 6, wherein the retention block comprises a top wall, a base wall facing the base wall of the supporting element and a grab portion connected to the top wall and configured for being caught by an installer.

14. The fiber management system according to claim 6, further comprising a plurality of splice trays pivotally mounted on a common supporting element around respective pivot axes parallel each other.

15. The fiber management system according to claim 6, further comprising a plurality of supporting elements stacked along a direction substantially perpendicular to the pivot axis.

16. The fiber management system according to claim 6, wherein each distributing element comprises a bottom wall defined by an end portion of the base wall of the supporting element and a lateral wall extending from the bottom wall and opposite to the guiding channel.

17. A fiber management system for managing and distributing optical fibers comprising:
  a supporting element;
  a splice tray pivotally mounted on the supporting element around a pivot axis;
  distributing elements for routing incoming fiber modules toward the splice tray and for routing outgoing fiber modules away from the splice tray, the distributing elements being oriented along respective routing directions transverse to the pivot axis;
  a guiding channel provided on the at least one supporting element for guiding the incoming fiber modules toward the splice tray along a direction substantially parallel to the pivot axis; and
  a retention block acting into the guiding channel between a plurality of retention positions wherein each retention position of the retention block defines a respective passageway for the incoming fiber modules, wherein each distributing element comprises a bottom wall defined by an end portion of a base wall of the supporting element and a lateral wall extending from the bottom wall and opposite to the guiding channel, the bottom wall and the lateral wall defining a respective central channel perpendicular to the pivot axis.

18. The fiber management system according to claim 17, wherein each distributing element comprises a weakening line between the bottom wall and the lateral wall configured for allowing the lateral wall to be detached from the bottom wall.

* * * * *